Feb. 14, 1939. F. F. BEIL ET AL Re. 21,001

DOOR FRAME CONSTRUCTION

Original Filed Jan. 6, 1936 3 Sheets-Sheet 1

Witness
H. S. Manzenmaier

Inventors
Forrest F. Beil & Earl E. Green
By Baw, Freeman & Sinclair
Attorneys

Feb. 14, 1939. F. F. BEIL ET AL Re. 21,001

DOOR FRAME CONSTRUCTION

Original Filed Jan. 6, 1936 3 Sheets-Sheet 2

Witness
H. S. Mancourmier

Inventors
Forrest F. Beil & Earl E. Green
By Bair, Freeman & Sinclair
Attorneys

Feb. 14, 1939. F. F. BEIL ET AL Re. 21,001

DOOR FRAME CONSTRUCTION

Original Filed Jan. 6, 1936 3 Sheets-Sheet 3

Witness
H. L. Muncenmaier

Inventors
Forrest F. Beil & Earl F. Green
By Bair, Freeman & Sinclair
Attorneys

Reissued Feb. 14, 1939

Re. 21,001

UNITED STATES PATENT OFFICE 21,001

DOORFRAME CONSTRUCTION

Forrest F. Beil and Earl E. Green, Clinton, Iowa, assignors, by mesne assignments, to Curtis Companies Incorporated, Clinton, Iowa, a corporation of Iowa Original No. 2,080,555, dated May 18, 1937, Serial No. 57,792, January 6, 1936. Application for reissue October 25, 1937, Serial No. 170,952

16 Claims. (Cl. 20—11)

An object of our invention is to provide an improvement in the design and arrangement of parts constituting a door frame or similar construction, especially for building openings, the improvement involving parts of comparatively simple design, which facilitate assembly of such a frame, especially an entrance door of ornamental construction.

Another object is to provide a construction so designed that a large number of different entrances can be assembled from a minimum number of standardized parts.

A further object is to so arrange the standardized parts that doors of different sizes can be fitted into an assembled entrance frame or building openings of various sizes can be accommodated.

A further object is to provide different designs of door entrance casing parts, such as various designs of pilasters, architraves and caps, which can be assembled for several different sizes of doors without changing to different sizes of pilasters, architraves and caps.

A still further object is to make a frame of standardized parts which is adaptable to wall structures of different types and thicknesses, a sub-jamb of the necessary width being provided to accomplish this object, in cases where the wall is of greater thickness than the width of the jamb will accommodate.

Another object is to provide for making up door entrances of various dimensions from a minimum number of parts in stock, and thus do away with the expensive method heretofore used in making up entrances to order in small quantities, and consequently at high cost to meet the varying and multitudinous demands of builders.

One of our principal objects, therefore, is to provide the building industry with an improved frame for building openings, the parts of which can be machined and prefabricated in large quantities of like parts, so that the cost of production can be reduced and the selling price to builders reduced, thus resulting in an increase in sales, whereby production can further be increased and still lower cost obtained.

A further object is to provide a door frame construction including side and head architraves of substantial width, which are overlapped by pilasters and a cap, the degree of overlapping being variable so that with a pair of pilasters of one length and a cap of one length, a number of different sizes of door openings (either standard or odd sizes) can be formed as desired, the pilasters having separable base members whereby the lower ends of the pilasters can be cut off on the job and the base members then applied to finish out the ornamental appearance of the pilasters.

A still further object is to provide parts of a door frame so constructed that a minimum of cutting and fitting is required to utilize the parts for different sizes of door openings.

Still a further object is to provide pilasters, caps and the like arranged around an opening in a building wall and supported in spaced relation to the wall, architraves or other ornamental members being provided to cover the portion of the wall intervening between the boundary of the opening and the inner edges of the pilasters and caps.

Still a further object is to provide such architraves so that they can be joined to the edge of an opening-defining member, such as a jamb, and have variable joint connection with the pilasters and cap, whereby their degree of reveal can be varied to accommodate different standard sizes of openings and/or compensate for variations in the installation of jamb members.

With these and other objects in view, our invention consists in the construction, arrangement and combination of the various parts of the device, whereby the objects contemplated are attained, as hereinafter more fully set forth, pointed out in our claims and illustrated in the accompanying drawings, in which:

Figure 1:
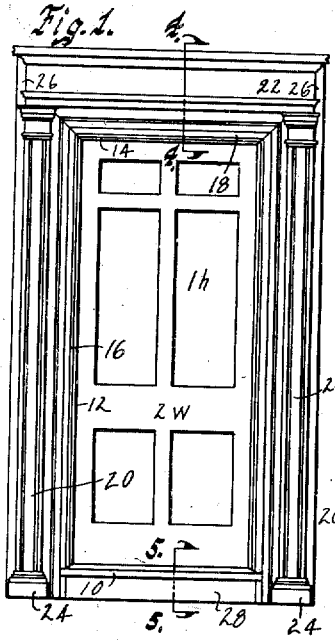
Figure 1 is a front elevation of a door frame embodying our invention and showing a door mounted therein.

On the accompanying drawings, we have used the reference numeral 10 to indicate a door sill. Side jambs are indicated at 12, and a head jamb at 14. The parts of the door frame construction include side architraves 16, a head architrave 18, pilasters 20 and a cap 22.

Figure 7:
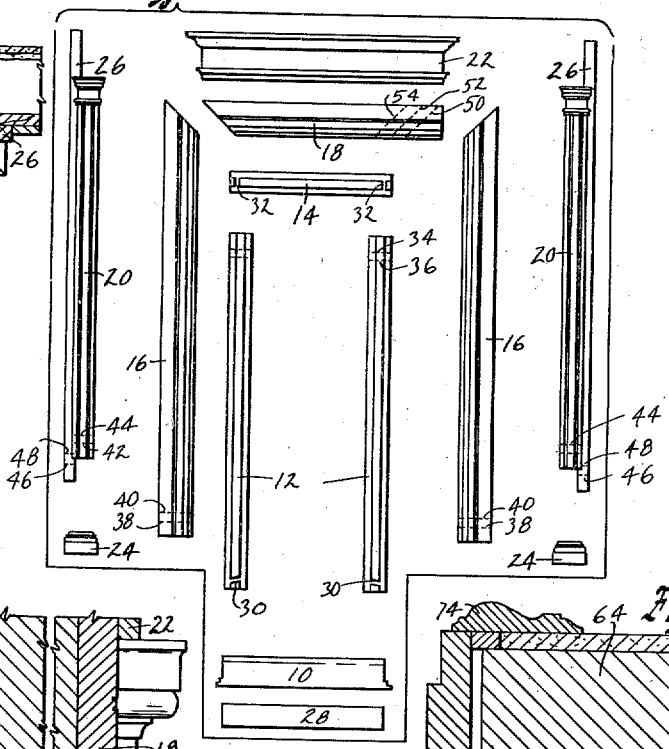
Figure 7 is an exploded view of parts of the door frame construction, the parts being shown in front elevation except as indicated otherwise hereinafter in the specification.

Base mold members 24 are provided for the lower ends of the pilasters 20, and the pilasters are usually provided with casing members 26 to overlap the walls. At 28 we illustrate an apron for depending from the sill. In Figure 7 the sill 10 is shown in top plan view, the side jambs 12 being shown in elevation as viewed from the center of the door frame, and the head jamb 14 is shown in bottom plan view.

The side jambs 12 are dadoed at their lower ends as indicated at 30 to receive the ends of the sill 10. The head jamb 14 has each end dadoed at 32 to receive the upper ends of the side jambs 12. The sill 10 and head jamb 14 are supplied of the proper width for the door opening, but the height of the door opening can be varied by cutting off the upper ends of the side jambs at 34 or 36, depending on the height of the door to which the frame is to be adapted. The side architraves 16 are also adapted for being cut off at 38 or 40 to properly fit the side architraves to the side jambs.

The pilasters 20 are also adapted for cutting off at 42 or 44, while the casing members 26 are adapted for cutting off at 46 or 48 to correspond with the lengths of the side architraves 16. The cap 22 is furnished in one length and overlaps the upper edge of the head architrave 18, the pilasters 20 overlapping the outer edges of the side architraves 16.

In order to provide uniformity in the appearance of the entrance, the head architrave must project downwardly from the cap the same distance that the side architraves project inwardly from the pilasters. One end of the head architrave can be cut as indicated at 50, 52 or 54, to thus fit the width of the door opening determined by the lengths of the sill 10 and head jamb 14. The cuts from 36 to 54 are all performed on the job, the parts 10, 28, 14 and 22 being furnished of proper length.

By the use of the foregoing described parts, we are able to provide for a great number of different door widths, and heights, which is best illustrated in Figures 1, 2, 3 and 11. In Figure 1 we illustrate the greatest height provided by the pilasters 20 in their original length, and for an intermediate width by projecting the head architraves 18 to an intermediate position as shown in Figures 1 and 4.

Figure 2:
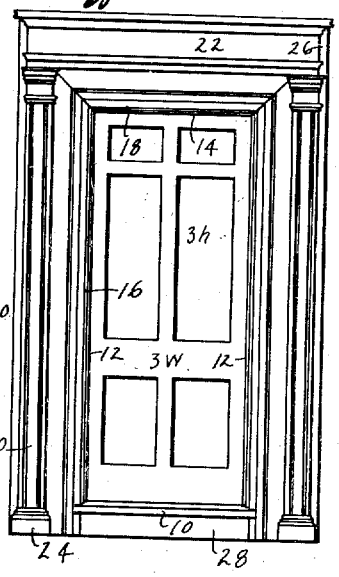
Figures 2 and 3 are similar front elevations showing respectively a shorter and narrower door and a still shorter and wider door.
Figure 3:
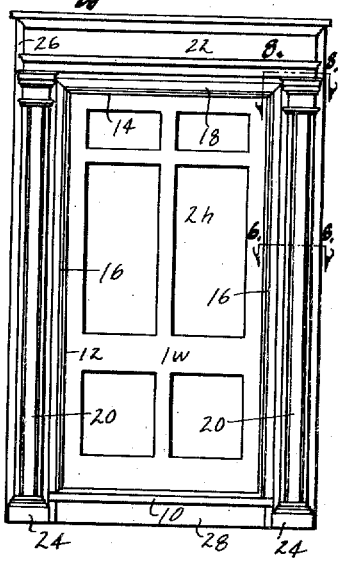
Figure 4:
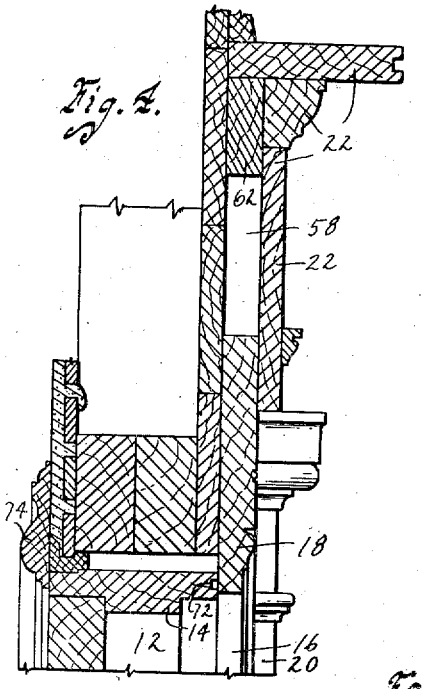
Figure 4 is an enlarged sectional view on the line 4—4 of Figure 1, showing the construction at the head jamb.
Figure 5:
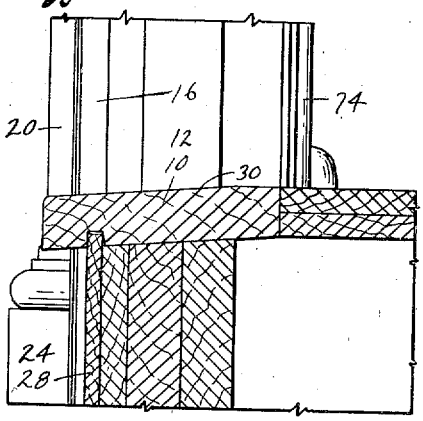
Figure 5 is an enlarged sectional view on the line 5—5 of Figure 1, showing the construction at the sill.

In Figure 3 we show the head architrave in the minimum projected position, and in Figure 2 to the maximum projecting position, thus reducing the height of the door considerably relative to the pilasters.

In Figure 2 we show the pilasters cut at 42, while in Figure 3 we show them cut at 44 (see Fig. 7), thus accommodating an intermediate and a short height of door respectively.

Obviously with three different widths and three different heights possible with one set of frame members, nine different sizes of doors can be accommodated, whereas formerly each size of door had to be produced individually with the parts cut to the proper length for the size of door to fit in the frame being ordered.

Although we have illustrated merely three different widths and heights, it is obvious that a great number of different widths and heights within the range of the particular set of frame parts supplied is procurable.

Figure 11:
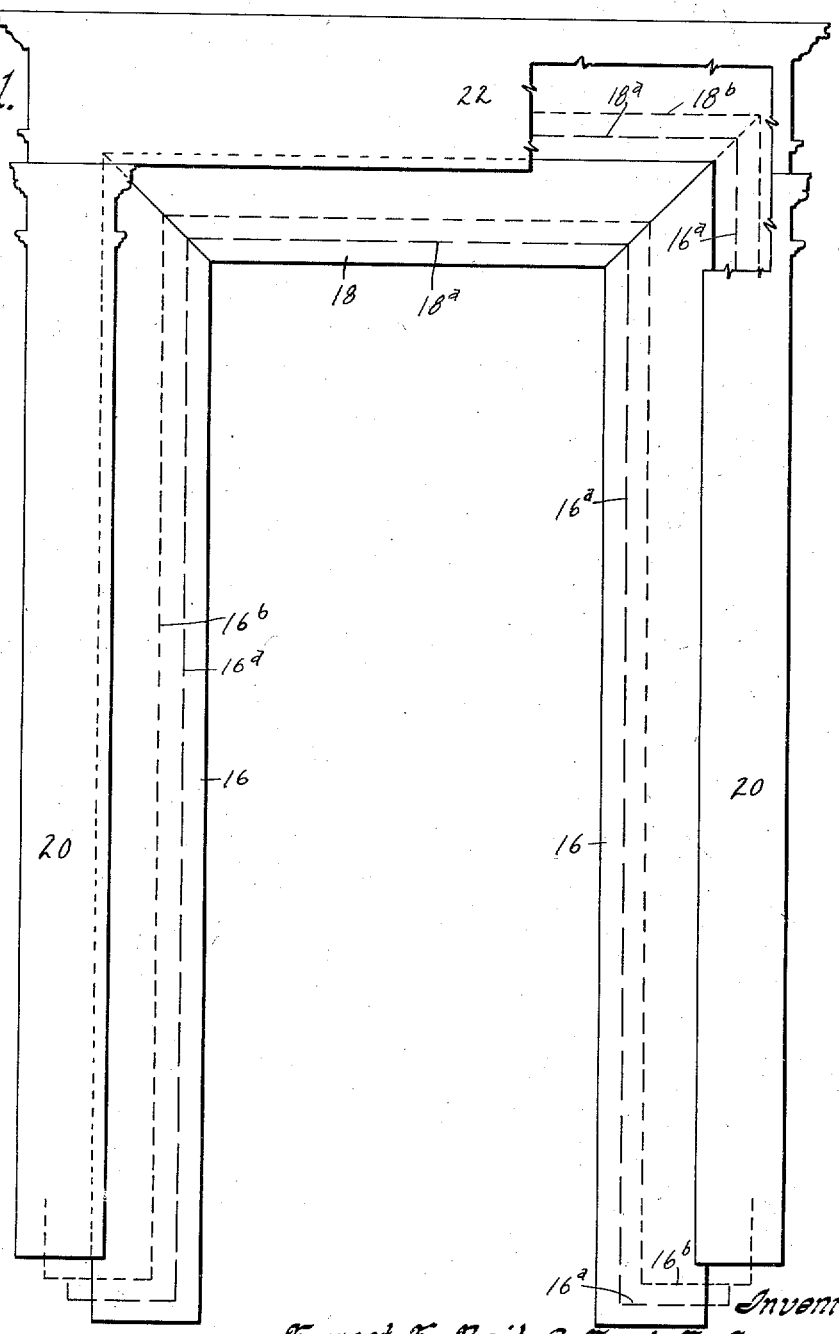
Figure 11 is a front elevation of a door frame embodying our invention showing the parts assembled for minimum door width and illustrating in dotted lines the relative positions of these parts for two other widths of door openings.

In Figure 11 we have shown somewhat diagrammatically how the architraves 16 and 18 may be varied in position relative to the pilasters 20 and the cap 22 to secure three different widths of door openings, retaining the same heights of openings. Surface contour lines of the preceding figures have been omitted from this figure to avoid confusion in the showing of dotted positions. In full lines the minimum width opening is illustrated, and it will be noted that the side architraves 16 project the same distance from the pilasters 20 that the head architrave projects from the cap 22. The head architrave for the minimum width (full line) position is cut at the line 54 in Figure 7.

To secure an intermediate width of opening, the side architraves are moved outwardly to the position indicated at **16*a* by dash lines. The head architrave 18 must similarly be moved upwardly to the position at 18*a* to project the same distance from the head architrave that the side architraves do from the pilasters. For this position the head architrave is cut at the line 52. Similarly the dotted positions at 16*b* and 18*b* are assumed by the architraves for a still wider door opening, the head architrave being cut on the line 50** for this purpose.

Since the side architraves 16 are made for a door opening of given height, the height of this opening will remain the same in the three illustrated positions of the architraves but the width will vary. For making shorter door openings, the side architraves can be cut at 38 or 40, and the pilasters at 42 or 44, the casing members 26 being correspondingly cut at 46 or 48.

By providing the base member 24 as a separable part, the bottom ends of the pilasters can be cut off square without any necessity for intricate fitting or reforming the pilaster base or the like. Our construction also provides for cutting off the lower ends of the side architraves and the upper ends of the side jambs squarely, the only mitered joint being necessary being the one at 50, 52 or 54 on the head architrave.

In Figure 4 the head architrave is projected to an intermediate position. This intermediate position for the side architrave is shown by dotted lines in Figure 6, the solid line showing being for the minimum projection, and the dash line showing for the maximum projection. It is obvious that by providing the architraves of substantial width, such variation is permissible, more or less projection merely resulting in less or more space indicated at 56 and 58 in Figures 6 and 4 respectively.

Figure 6:
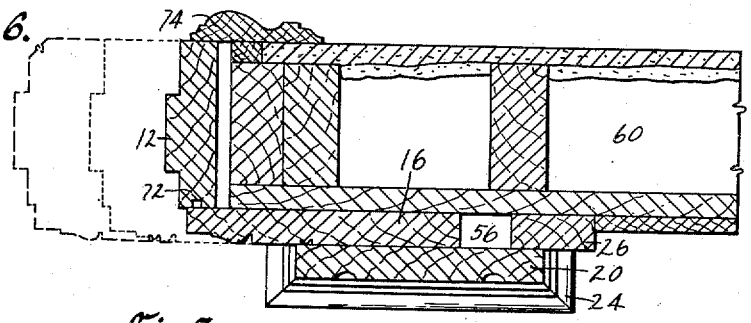
Figure 6 is an enlarged sectional view on the line 6—6 of Figure 3, showing the construction of the side jamb.
Figure 8:
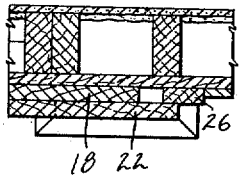
Figure 8 is a sectional view on the line 8—8 of Figure 3, showing the extension of a casing member in the door frame to a position behind the cap.
Figure 10:
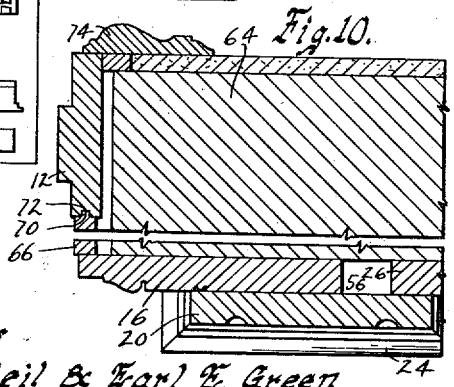
Figure 10 is a sectional view similar to a portion of Figure 6, showing a similar extension or sub-jamb for the side of the frame.

The side architraves 16 are applied to the outer edges of the side jambs 12, as shown in Figure 6, for a wall 60 of minimum thickness. The head architrave is positioned against the wall, and the cap 22 against the head architrave as in Figure 4, a filler block 62 being used to space the upper edge of the cap, whereas the casing member 26, shown in Figure 6, accomplishes a similar purpose for the pilaster.

Where a wall construction is thicker, such as a masonry wall 64, as shown in Figures 8 and 10, a sub or extension side jamb 66 and a sub or extension head jamb 68 are used. These may vary in width, wider ones being used for thicker walls and vice versa. These are preferably provided with tongues 70, which fit into grooves 72 in the outer edges of the jambs 12 and 14, to provide a weather-tight connection at this point. The architraves are then applied to the outer edges of the sub-jambs.

Figure 9:
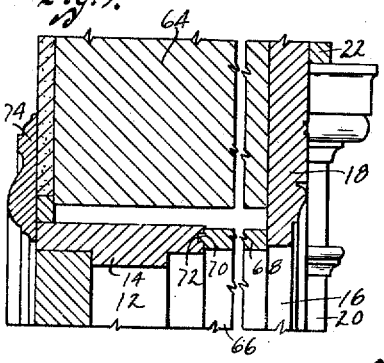
Figure 9 is a sectional view similar to a portion of Figure 4 showing the use of an extension or sub-head jamb to accommodate a wall of greater thickness.

By the use of our door frame construction a great number of different sizes of door openings can be provided with one set of frame parts and manufacturing and installation variations can be compensated for. The only variation in appearance of the various sizes of door frames is in the relative degree of extension of the architraves from the pilasters and cap. The architraves are preferably provided with longitudinal ornamentations such as moldings and grooves as illustrated particularly in Figures 6, 9 and 10, some of which, in the minimum extension of the architraves, are concealed, but which are apparent when the architraves are extended so that in any extended position of the architraves relative to the pilasters and cap, the ornamental appearance of the door frame is not detracted from.

The side casings 26, it will be noted, extend beyond the upper ends of the pilasters in Figure 7. In Figure 8 these are shown extending up behind the ends of the cap, thus providing additional engaging surfaces to be nailed together for effectively securing the cap relative to the other frame parts.

The inside of the door opening may be trimmed in any of the usual methods, comprising interior trim such as indicated at 74, plaster returns or the like.

From the foregoing it is obvious that one of the essential features of our invention is the movability of architraves or the like relative to pilasters, caps or the like to take care of different sizes of building openings without however using different sizes of pilasters and caps. Adjustment is possible without opening up any joints or otherwise complicating installation of the frame relative to the building opening.

Although we have shown one ornamental type of pilaster and cap, it is obvious that pilasters and caps can be made in other shapes or contours, and other changes also may be made without departing from the real spirit of our invention, and it is our intention to cover by our claims any modified forms of structure or use of mechanical equivalents which may be reasonably included within their scope.

We claim as our invention:

1. In a door frame construction for a wall, a pair of side jambs, a sill, a head jamb, a pair of side architraves and a head architrave, said architraves extending in the plane and over the face of the wall from said side and head jambs respectively, a pair of pilasters spaced from the wall and overlapping the outer edges of said side architraves and a cap across the upper ends of said pilasters and overlapping the upper edge of said head architrave, said side and head architraves being of substantial width to project to greater or less degree from said pilasters and cap to accommodate doors of smaller or larger dimensions.

2. For use in a wall, a door frame construction comprising jambs, architraves, and ornamental members spaced from the wall and overlying the architraves at the sides and top of said door frame, the door opening defined by said jambs being selectively variable by relative re-arrangement in the spacing and by shortening of said jambs and architraves.

3. In an ornamental door frame construction for a wall and adapted for different sizes of doors, a plurality of frame members comprising a cap, pilasters, head and side jambs and architraves having joint relationship therewith, said architraves being movable relative to said cap, pilasters and wall, and being located between said cap and the wall and between said pilasters and the wall to define door openings of various dimensions with the use of one set of caps, pilasters, head jambs, side jambs and architraves.

4. An ornamental frame construction adapted for mounting in a wall including a side jamb, an architrave, and a pilaster, said architrave being adapted at one edge for assembly with said jamb, and at the other edge for selective relative spacing and assembly relative to said pilaster in a position interposed between the pilaster and a face of the wall in which the frame is mounted.

5. An ornamental frame construction adapted for mounting in a wall including a head jamb, an architrave and a cap, said architrave being in a position interposed between the cap and a face of the wall in which the frame is mounted, one edge of said architrave being assembled against the edge of a jamb and its other edge being movable relative to said cap and wall.

6. For use in connection with a wall, a door frame construction comprising a pair of side jambs, side architraves applied to the outer edges thereof and overlapping the face of said wall, spaced pilasters, said architraves being located between said pilasters and said wall and movable relative thereto to define varying widths of door openings.

7. For use in a wall, a door frame construction comprising side and head jambs, side and head architraves extending from the edges thereof and overlapping the face of said wall, spaced pilasters and a cap member, said architraves being located between said pilasters and said wall and movable relative thereto and between said cap and said wall and movable relative thereto to define varying widths and heights of door openings.

8. For use in a wall, a door frame construction comprising jambs, architraves overlapping the wall sheathing and ornamental members overlying the architraves and the wall at the sides and top of said architraves and having joint relationship therewith, said jambs and architraves being movable relative to said wall sheathing and relative to said ornamental members to vary the dimensions of door openings defined by the jambs, and sub-jambs interposed between the inner edges of said architraves and edges of said jambs.

9. For use in connection with a wall having an opening therein, an ornamental member, means for supporting said ornamental member on and spaced from the surface of said wall in a position adjacent said opening with one edge thereof spaced from the opening, and means to cover the portion of said wall intervening between said edge and said opening, said last means partially occupying the space between said ornamental member and said surface of said wall and being movable in said space to cover said intervening portion of said wall to the necessary degree dependent upon installation variations of the ornamental member relative to the opening.

10. In apparatus for trimming an opening in a wall, first and second ornamental members, said first ornamental members being arranged around said opening, supported on the wall and spaced from both the edge of the opening and the surface of said wall, said second ornamental members having parts thereof occupying the space between said first ornamental members and said surface of said wall and having other parts thereof extending across the portion of the wall between the edge of said first ornamental members and the opening in said wall.

11. In a structure of the class described for use in connection with a wall having an opening therein, a jamb defining one side of said wall opening, the front portion of said jamb being substantially aligned with a face of said wall, an ornamental member overlying and spaced from said face of said wall and spaced along the wall from said jamb, a connecting ornamental member to cover the portion of said wall intervening between said first ornamental member and said jamb, said connecting ornamental member having joint connection with said front portion of said jamb and with the back of said first ornamental member, said connecting ornamental member being of a width to accommodate variable spacings between said joint connections when the jambs are moved toward or from said first ornamental member to define wall openings of different dimensions.

12. In a structure of the class described for use with a wall having an opening therein, jambs to define two sides of said opening, pilasters overlying and spaced from one face of said wall and fixed relative to the wall with their inner edges spaced wider apart than said jambs, architraves for covering the wall areas intervening between said jambs and said pilasters, said architraves having ornamental facial grooves and molds, each architrave at one edge being engaged with one of said jambs and at the other edge being inserted between the face of said wall and one of said pilasters, said jambs being adapted for movement to define door openings of different widths, said architraves covering said wall areas and showing different face reveal corresponding to different wall opening sizes as defined by said jambs in relation to said pilasters.

13. In a structure for use with a wall having an opening therein, jambs to define two sides of said opening, pilasters overlying and spaced from a surface of said wall, said pilasters being fixed relative to the wall with their inner edges spaced wider apart than said jambs, means at their outer edges to close the spaces between said pilasters and said surface of said wall, architraves for covering the wall areas intervening between said jambs and said pilasters, said architraves having ornamental facial grooves, each architrave at one edge being engaged with one of said jambs and at the other edge being inserted in one of said spaces, said jambs being adapted for movement to define door openings of different widths, said architraves covering said wall areas and showing different face reveal corresponding to different wall opening sizes.

14. In a structure of the class described, jambs defining the sides of a wall opening, ornamental members spaced from a face of said wall and spaced from each other a distance greater than the width of said opening, second ornamental members to conceal the face of said wall between said jambs and said first ornamental members, said second ornamental members being engaged at one edge with said jambs and at their other edge projecting into the space behind said first ornamental members and having lap joint connection therewith whereby the face exposure of said second ornamental members may vary and said lap joint connections be maintained when the opening width between said jambs is increased or decreased to fit different sizes of doors or the like.

15. For use with a building opening frame having jambs, ornamental members substantially surrounding said opening, said jambs being set in a wall of the building and some of said ornamental members being supported on said wall in spaced relation to a face thereof, the other ornamental members being inserted between said face of said wall and said first ornamental members to span and cover the space on the wall between said first ornamental members and said jambs, joints between said first and second ornamental members constructed to permit movement and positioning of one relative to the other when the space from the first ornamental member to the jamb varies due to variations common in building construction.

16. In a structure of the class described, a door frame including jambs set in a wall, pilasters spaced apart a greater distance than the distance between said jambs, said pilasters being supported on said wall with space between the pilasters and the face of the wall, architraves extending into such space and having joint relationship with said pilasters which permits the architraves to be moved relative to the pilasters while adapting them to span a variable space on the wall between the pilaster and the door jamb to adapt one set of pilasters a fixed distance apart for use with a plurality of doors of varying widths.

FORREST F. BEIL.
EARL E. GREEN.